(12) United States Patent
Ramotowski et al.

(10) Patent No.: US 7,078,101 B1
(45) Date of Patent: Jul. 18, 2006

(54) HIGH STRAIN ELECTROSTRICTIVE POLYMER

(75) Inventors: Thomas S. Ramotowski, Tiverton, RI (US); George J. Kavarnos, New London, CT (US); Qiming Zhang, State College, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 87 days.

(21) Appl. No.: 10/719,852

(22) Filed: Nov. 21, 2003

Related U.S. Application Data

(60) Provisional application No. 60/428,167, filed on Nov. 21, 2002.

(51) Int. Cl.
*B32B 27/30* (2006.01)

(52) U.S. Cl. ............... 428/421; 526/249; 526/250; 524/545

(58) Field of Classification Search ............. 526/249, 526/250; 524/545; 428/421
See application file for complete search history.

(56) References Cited

U.S. PATENT DOCUMENTS

| | | | |
|---|---|---|---|
| 3,318,854 A * | 5/1967 | Honn et al. ............ 526/249 |
| 4,543,293 A * | 9/1985 | Nakamura et al. ........ 428/421 |
| 4,557,880 A | 12/1985 | Pantelis |
| 4,577,005 A | 3/1986 | Sako et al. |
| 4,778,867 A | 10/1988 | Pries |
| 4,863,648 A * | 9/1989 | Scheinbeim et al. ........ 264/430 |
| 5,087,679 A | 2/1992 | Inukai et al. |
| 6,355,749 B1 | 3/2002 | Chung et al. |
| 6,787,238 B1 * | 9/2004 | Zhang et al. ............ 428/421 |
| 2002/0132074 A1 | 9/2002 | Gervasi et al. |

* cited by examiner

*Primary Examiner*—David W. Wu
*Assistant Examiner*—Henry S. Hu
(74) *Attorney, Agent, or Firm*—James M. Kasischke; Michael P. Stanley; Jean-Paul A. Nasser

(57) ABSTRACT

The present invention is a new class of terpolymers for use as high strain electrostrictive polymer films. More particularly, the invention is a class of electrostrictive terpolymers comprising vinylidene fluoride (VDF), trifluoroethylene (TrFE) and at least one monomer having at least one halogen atom side group. The monomer is preferably an ethylene-based monomer and preferably selected to favor gauche-type linkage along the polymer backbone. The halogen atom side group is preferably large enough to move or cause adjacent polymer chains to be farther apart from or away from each other than in the absence of such side group, but not so large that it would inhibit polymer crystallites from forming. The monomer is preferably a chloro-monomer such as chlorofluoroethylene (CFE). The chlorofluoroethylene (CFE) is preferably 1-chloro-2-fluoroethylene or 1-chloro-1-fluoroethylene. The chlorofluoroethylene (CFE) favors gauche-type linkage which favors high electrostrictive strains.

8 Claims, 3 Drawing Sheets

HIGH STRAIN ELECTROSTRICTIVE POLYMER

The present application is based on a Provisional Application, No. 60/428,167, which was filed on Nov. 21, 2002, and which is entitled HIGH STRAIN PIEZO-POLYMER by Thomas Ramotowski, George Kavarnos, and Qiming Zhang.

STATEMENT OF GOVERNMENT INTEREST

The invention described herein may be manufactured and used by the Government of the United States of America for Governmental purposes without the payment of any royalty thereon or therefor.

CROSS REFERENCE TO OTHER RELATED APPLICATIONS

None.

BACKGROUND OF INVENTION (1) Field of the Invention

This invention relates to a new class of terpolymers for use as high strain electrostrictive polymer films. More particularly, the invention relates to a class of electrostrictive terpolymers comprising vinylidene fluoride (VDF), trifluoroethylene (TrFE) and at least one monomer having at least one bulky halogen atom side group. The monomer is preferably a chloro-monomer such as chlorofluoroethylene (CFE) or chlorotrifluoroethylene (CTFE). The chlorofluoroethylene (CFE) is preferably 1-chloro-2-fluoroethylene or 1-chloro-1-fluoroethylene.

(2) Description of the Prior Art

Many research activities in the past decade have focused on vinylidene fluoride-trifluoroethylene (VDF-TrFE) copolymers with the goal of reducing the energy barrier for ferroelectric-paraelectric phase transition and generating large and fast electric-induced mechanical responses at ambient temperatures. The close connection between the crystalline structure and electric properties led to many attempts to alter copolymer morphology by mechanical deformation, electron-radiation, crystallization, etc.

One of the main methods of processing or converting polymers into electrostrictive polymers has been by electron irradiation. Electron irradiation is the exposure to high-energy electrons. Electron irradiation of polymer films serves to break up the large crystalline regions of the polymer films into polar micro-regions resulting in a high-strain electrostrictive material.

Electrostriction is the high strains displayed by certain materials when stressed by electric fields. The magnitude of the electrostrictive strain can be described by the following equation:

$$S=QP^2,$$

where Q is the electrostrictive coefficient and P is the polarization of the material.

Ferroelectric polymers such as poly(vinylidene fluoride-trifluoroethylene) [P(VDF-TrFE)] films, previously annealed, can be converted into electrostrictive polymers by exposure to high energy electron bombardment. Electron bombardment of high crystalline P(VDF-TrFE) films break up the long-range ferroelectric region into polar micro-domains thereby broadening the ferroelectric-to-paraelectric transition and moving the transition to a lower temperature where high strains can be observed when the films are driven by large electric fields. These strains in the polymer films caused by electron bombardment and the ensuing effects on the polymer structure can be characterized by differential scanning calorimetry, X-ray diffraction and infrared spectroscopy.

Ferroelectric polymers can contain various trans and gauche configurations, including form I($\beta$), II($\alpha$), and III($\gamma$). In form I, the chains exhibit an all-trans configuration. In form II, the packed chains exhibit the tgtg' (t=trans; g,g'=gauche) conformation, resulting in a nonpolar crystallite. In form III, the chains exhibit tttgtttg' conformation, resulting in a monoclinic lattice and a polar cell.

Electron irradiation, i.e., electron bombardment, of these ferroelectric polymers converts the polar all-trans form I($\beta$), long-range ferroelectric regions of annealed P(VDF-TrFE) films into nanoregions consisting of coexisting I($\beta$), II($\alpha$), and III($\gamma$) crystallites, preferably having Curie (polar-nonpolar crystalline phase) transition at ambient temperatures. The polarization of these regions give rise to a macroscopic polarization and increase in the dielectric constant. The macroscopic polarization provides an increase in dielectric constant, large strains, much improved coupling constants and large (d33) signal piezoelectric constant.

Where the electrostrictive strains of materials are high enough, materials having this property offer great promise in applications such as sensors, underwater sonar transduction, polymeric actuators, artificial muscles, and robotics. In these and other applications, the high strain electrostrictive materials provide higher/greater sensitivity, more powerful signals and more efficient energy conversion.

However, electron irradiation, i.e., electron bombardment, is cumbersome and expensive. Electron irradiation is also a slow process because a large dose of radiation is needed to achieve electrostrictive properties. Other disadvantages associated with using electron irradiation which cause it to be a slow process is that: (1) only a limited thickness of films can be irradiated at a time; (2) the electron beam used is narrow, while film size varies and can be much wider than the electron beam; and (3) a vast-fluctuation in conditions may exist throughout the electron irradiation process.

The prior art discloses various polymers such as Nakamura et al., U.S. Pat. No. 4,543,293, which is said to disclose a piezoelectric polymer comprising vinylidene fluoride, trifluoroethylene and vinyl fluoride.

Also known in the prior art is Pantelis, U.S. Pat. No. 4,557,880, which is said to disclose a piezoelectric film made from vinylidene fluoride and tetrafluoroethylene and/or trifluoroethylene.

Also known in the prior art is Sako et al., U.S. Pat. No. 4,577,005, which is said to disclose a polymeric dielectric material comprising a terpolymer which comprises vinylidene fluoride, trifluoroethylene and hexafluoropropylene that is heat treated.

Also known in the prior art is Preis, U.S. Pat. No. 4,778,867, which is said to disclose a ferroelectric random copolymer consisting essentially of vinylidene fluoride and trifluoroethylene that is heat treated.

Also known in the prior art is Inukai et al., U.S. Pat. No. 5,087,679, which is said to disclose a polymeric dielectric which comprises vinylidene fluoride, trifluoroethylene and chlorotrifluoroethylene.

Also known in the prior art is Chung et al., U.S. Pat. No. 6,355,749, which is said to disclose a ferroelectric terpolymer comprising vinylidene fluoride, trifluoroethylene and chlorotrifluoroethylene or hexafluoropropene.

Also known in the prior art is Gervasi et al., U.S. Pub. No. 2002/0132074, which is said to disclose a fluoroelastomer terpolymer comprising vinylidene fluoride, hexafluoropropylene and tetrafluoroethylene or chlorotrifluoroethylene.

Other ferroelectric and electrostrictive polymers and methods of altering polymer morphology may be known. However, these polymers and methods, along with those above, have various shortcomings. These shortcomings are addressed by the present invention. As such, the present invention provides electrostrictive polymers using an alternative method of altering copolymer morphology, without the need for electron irradiation.

SUMMARY OF THE INVENTION

A primary objective of the present invention to produce an electrostrictive terpolymer such as vinylidene fluoride-trifluoroethylene-chlorofluoroethylene (VDF-TrFE-CFE), without utilizing electron irradiation, which may be used as an active material capable of generating sound in acoustic, underwater transducers and mechanical motion in actuator devices.

It is also a primary objective of the present invention to produce an electrostrictive terpolymer such as VDF-TrFE-CFE which may be used as a replacement for electron irradiated high-strain P(VDF-TrFE) films.

It is also a primary objective of the present invention to produce an electrostrictive terpolymer such as VDF-TrFE-CFE which has gauche-type conformational defects along the polymer chain which results in a broad distribution of polarizations that favor higher electrostrictive strains than current electrostrictive polymers.

It is also an objective of the present invention to produce an electrostrictive terpolymer which exhibits larger mechanical strains than known in the art.

It is also an objective of the present invention to process an electrostrictive terpolymer such as VDF-TrFE-CFE which is less expensive and less cumbersome than current electrostrictive materials and methods of making those electrostrictive materials.

In accordance with the present invention there is provided a new class of terpolymers for use as high strain electrostrictive polymer films. More particularly, the invention relates to a class of terpolymers comprising at least three monomers wherein their reaction produces terpolymers having high electrostrictive properties. Specifically, the electrostrictive terpolymers comprise vinylidene fluoride (VDF), trifluoroethylene (TrFE) and at least one monomer having at least one halogen atom side group. The monomer is preferably an ethylene-based monomer and preferably selected to favor gauche-type linkage along the polymer backbone. The halogen atom side group is preferably bulky or large enough to move or cause adjacent polymer chains to be farther apart from or away from each other than in the absence of such halogen atom side group, but not so large that it would inhibit polymer crystallites from forming. The monomer is preferably a chloro-monomer such as chlorofluoroethylene (CFE). The chlorofluoroethylene (CFE) is preferably 1-chloro-2-fluoroethylene or 1-chloro-1-fluoroethylene. The monomer may also be chlorotrifluoroethylene (CTFE), but CTFE favors trans-type linkage instead of gauche-type linkage. As such, electrostrictive terpolymers comprising CFE have higher electrostrictive strains than terpolymers comprising CTFE.

Other details of the high strain polymer of the present invention, as well as other objects and advantages attendant thereto, are set forth in the following detailed description and accompanying drawings.

BRIEF DESCRIPTION OF THE DRAWINGS

Referring now to the drawings.

DESCRIPTION OF THE PREFERRED EMBODIMENTS

Materials having high electrostrictive strains are beneficial for use in applications such as sensors, underwater sonar transduction, polymeric actuators, artificial muscles, and robotics for providing higher/greater sensitivity, more powerful signals and more efficient energy conversion. As such, new electrostrictive materials and methods of synthesizing these electrostrictive materials are being developed to replace electron irradiated high strain polymer vinylidene fluoride-trifluoroethylene [P(VDF-TrFE)] films while possessing all of the electrostrictive properties of the electron irradiated high strain P(VDF-TrFE) films.

Accordingly, the present invention is a new class of terpolymers for use as high strain electrostrictive polymer films. More particularly, the invention is a class of electrostrictive terpolymers comprising vinylidene fluoride (VDF), trifluoroethylene (TrFE) and at least one monomer having at least one halogen atom side group. The monomer is preferably an ethylene-based monomer and preferably selected to favor gauche-type linkage along the polymer backbone.

The halogen atom side group is preferably bulky or large enough to move or cause adjacent polymer chains to be farther apart from or away from each other than in the absence of such halogen atom side group, but not so large that it would inhibit polymer crystallites from forming. In a preferred embodiment, the halogen atom side group in the monomer is preferably chlorine. The introduction of chlorine in the polymer chain affects crystal packing during annealing by acting as a defect that disrupts the polar all-trans long-range regions in the polymer into nanoregions. Specifically, the introduction of chlorine atoms into the polymer chains creates conformational defects that provide the mechanism to break up the all-trans long-range crystalline regions and disrupt the long-range ferroelectric order, thereby converting these regions into nanoregions.

The chlorine forces the crystalline dimensions to expand and distort to accommodate the chlorine atoms. The disrupted polar regions can be regarded as distorted defect structures which give rise to random polar fields and electrostrictive properties such as high strains. This effect is attributed to the large van der Waals radius of the chlorine atom. Specifically, the van der Waals radius of chlorine is 1.8 Å.

Figure 2:
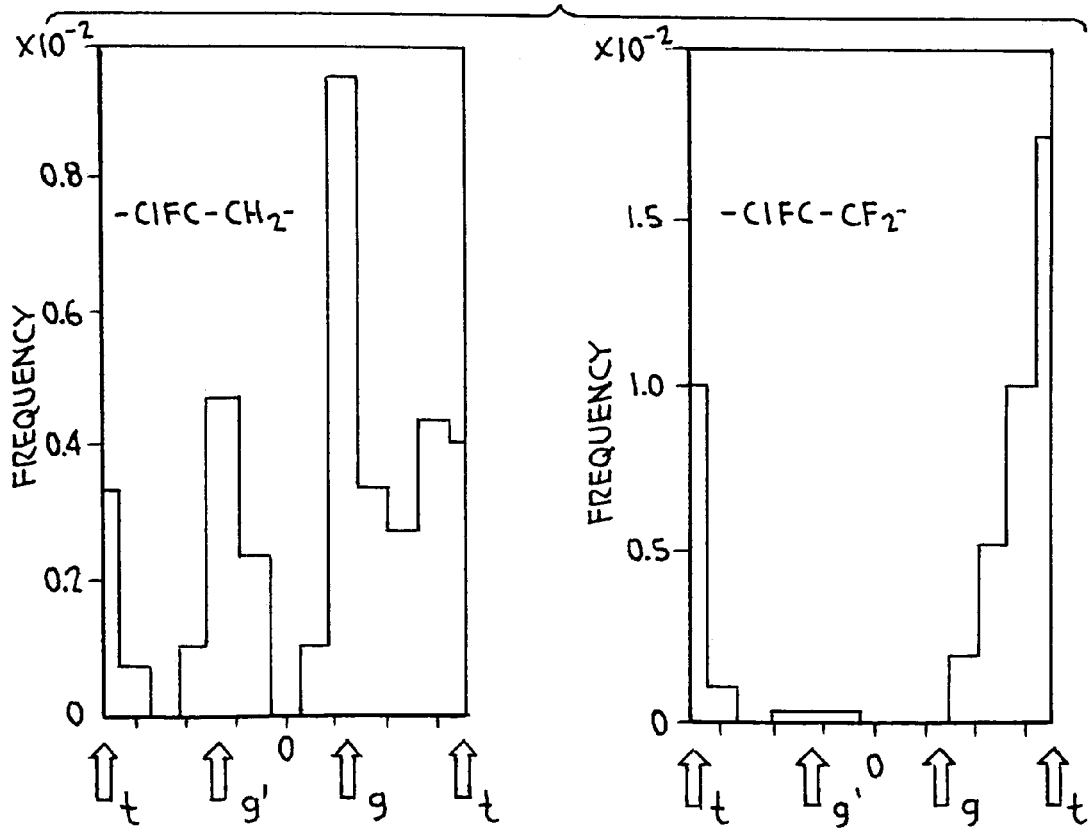
FIG. 2 are graphs comparing the dihedral distributions following a molecular dynamic simulation of 100 monomer chains of —ClFC—CH$_2$— (left) and —ClFC—CF$_2$— (right)

In a preferred embodiment, a chloro-monomer which can convert VDF-TrFE polymer films into high-strain electrostrictive films is chlorofluoroethylene (CFE), preferably 1-chloro-2-fluoroethylene or 1-chloro-1-fluoroethylene. The chloro-monomer may also be chlorotrifluoroethylene (CTFE), but CTFE favors trans-type linkage. As such, electrostrictive terpolymers comprising CFE have higher electrostrictive strains than terpolymers comprising CTFE. FIG. 2 illustrates the dihedral distribution of monomer chains of chlorofluoroethylene (—ClFC—$CH_2$—) and chlorotrifluoroethylene (—ClFC—$CF_2$—). As shown, chlorofluoroethylene (—ClFC—$CH_2$—) has higher frequencies at gauche-type linkages, whereas chlorotrifluoroethylene (—ClFC—$CF_2$—) has higher frequencies at trans-type linkages.

A chloro-monomer added to the VDF-TrFE copolymer provides higher electrostrictive strains than non-chloro-monomers such as hexafluoropropylene (HFP), which contains a trifluoromethyl side group. The trifluoromethyl group is too large and too bulky and gets annealed out of the crystallites. Because of the large size of the trifluoromethyl group, HFP does not favor gauche-type linkage along the polymer chain. As such, HFP produces lower electrostrictive strains than the chloro-monomer in the present invention when added to P(VDF-TrFE).

Even if the amount of HFP was varied, these results do not change. If a small amount of HFP is used to form the terpolymer, some of the trifluoromethyl groups may temporarily be trapped within the crystallites, but over time, those groups will be annealed out. As such, its performance decreases over time. If a large amount of HFP is used to form the terpolymer, the increased amount of HFP added to the VDF-TrFE copolymer greatly reduces crystallinity, which leads to low polarization and low strains. Accordingly, adding HFP to the VDF-TrFE copolymer does not provide optimum electrostrictive properties.

Figure 1:
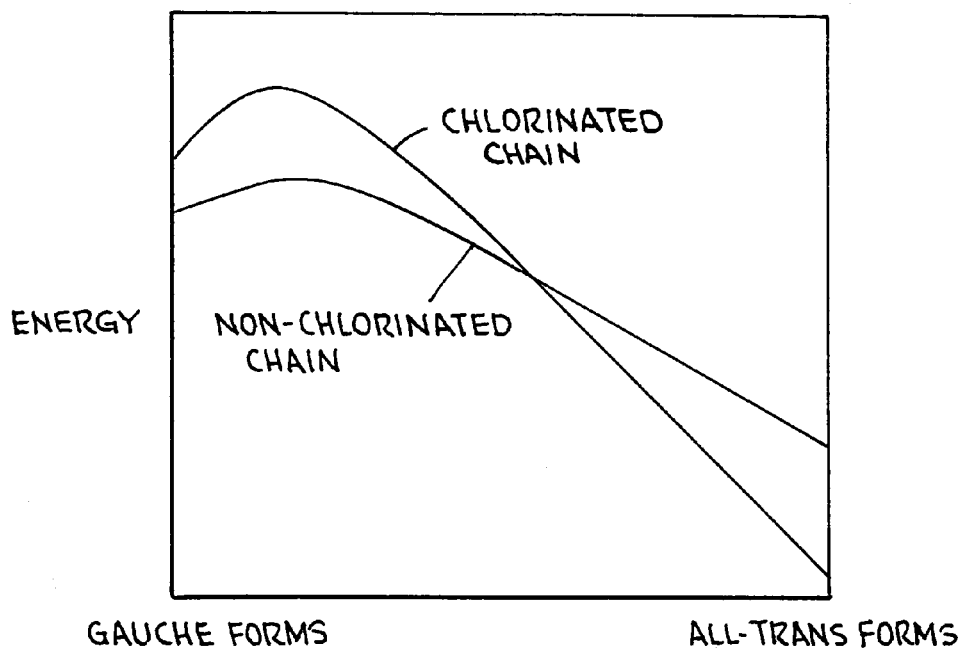
FIG. 1 is a graph illustrating the energy of gauche forms and all-trans forms of a chlorinated chain polymer compared to a non-chlorinated chain polymer.

As provided by the terpolymer of the present invention and as shown in FIG. 1, adding a chloro-monomer which favors gauche-type linkage to the VDF-TrFE copolymer synthesizes a terpolymer having higher energy, i.e., higher electrostrictive properties such as higher electrostrictive strains, than a terpolymer synthesized by adding a non-chloro-monomer, such as HFP, as the monomer. This result is due to the chlorine group on the chloro-monomer being not too large to inhibit polymer crystallites from forming, but large enough to push or move the polymer chains farther apart from or away from each other than in the absence of such chlorine group, thereby distorting the polymer crystal lattice. The chloro-monomer CFE of the preferred embodiment of the present invention favors gauche-type linkage along the polymer chain which produces higher electrostrictive strains.

While CTFE is a chloro-monomer, it favors trans-type linkage along the polymer chain and does not result in the highest electrostrictive strains possible, as shown in FIG. 2. Alternatively, CFE is a chloro-monomer wherein its chlorine group is large enough to push or move the polymer chains farther apart from or away from each other than in the absence of such chlorine group, thereby distorting the polymer crystal lattice, but also favors the performance-enhancing gauche-type polymer chain configurations, as shown in FIG. 2. Therefore, the terpolymer VDF-TrFE-CFE of the present invention has side groups (fluorine and chlorine) which are large enough to cause a crystal lattice disruption, but small enough not to seriously degrade crystallinity, thereby resulting in performance-enhancing gauche-type polymer chain configurations having higher polarization and higher electrostrictive strains.

Figure 3:
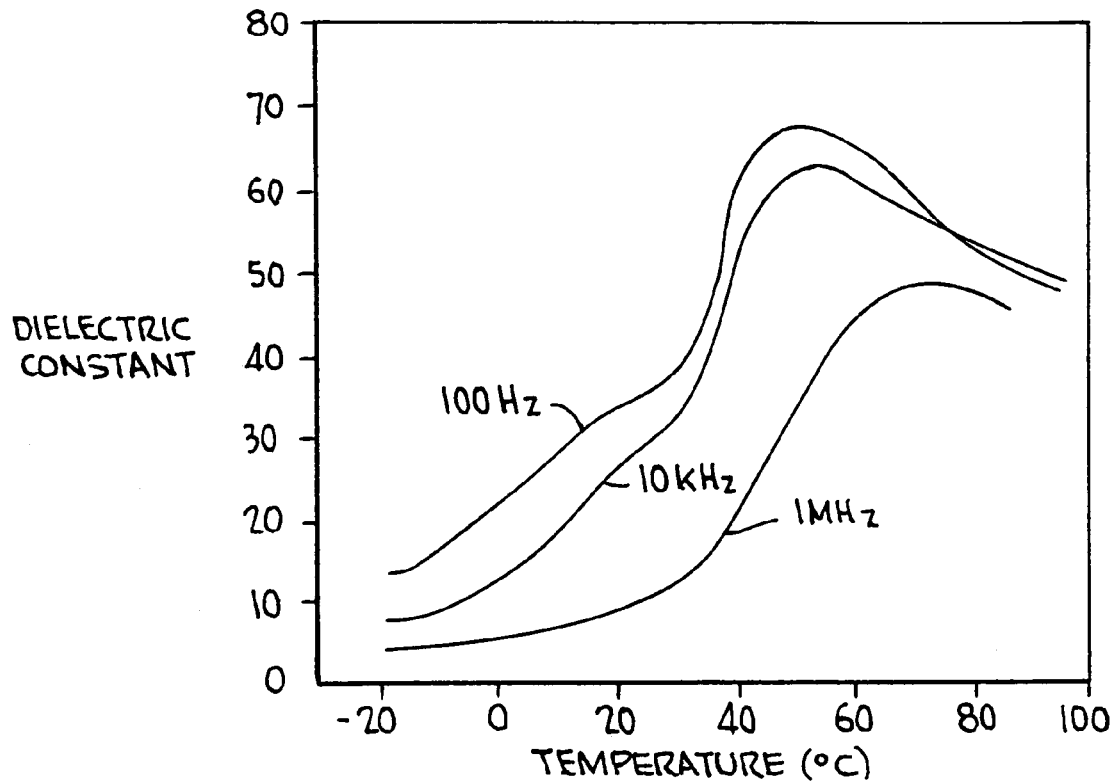
FIG. 3 is a graph illustrating the dielectric constant versus temperature for VDF-TrFE-CFE terpolymers of the present invention at various frequencies.
Figure 4:
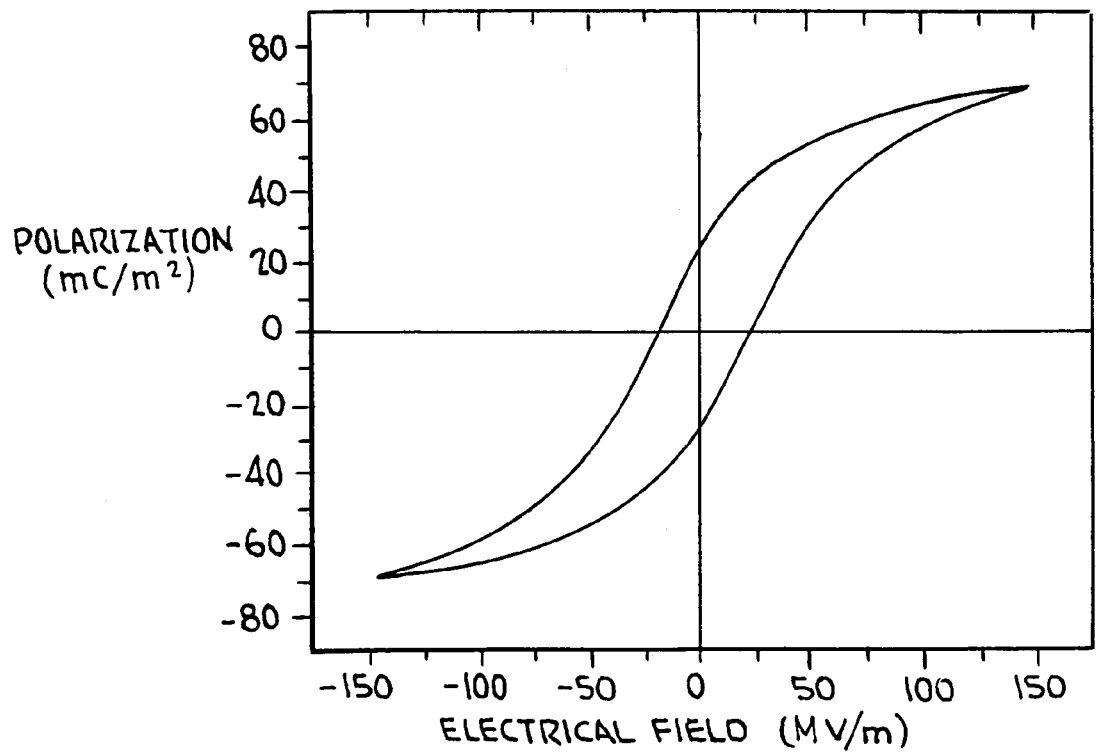
FIG. 4 is a graph comparing the polarization versus the applied electric field for VDF-TrFE-CFE terpolymers of the present invention.
Figure 5:
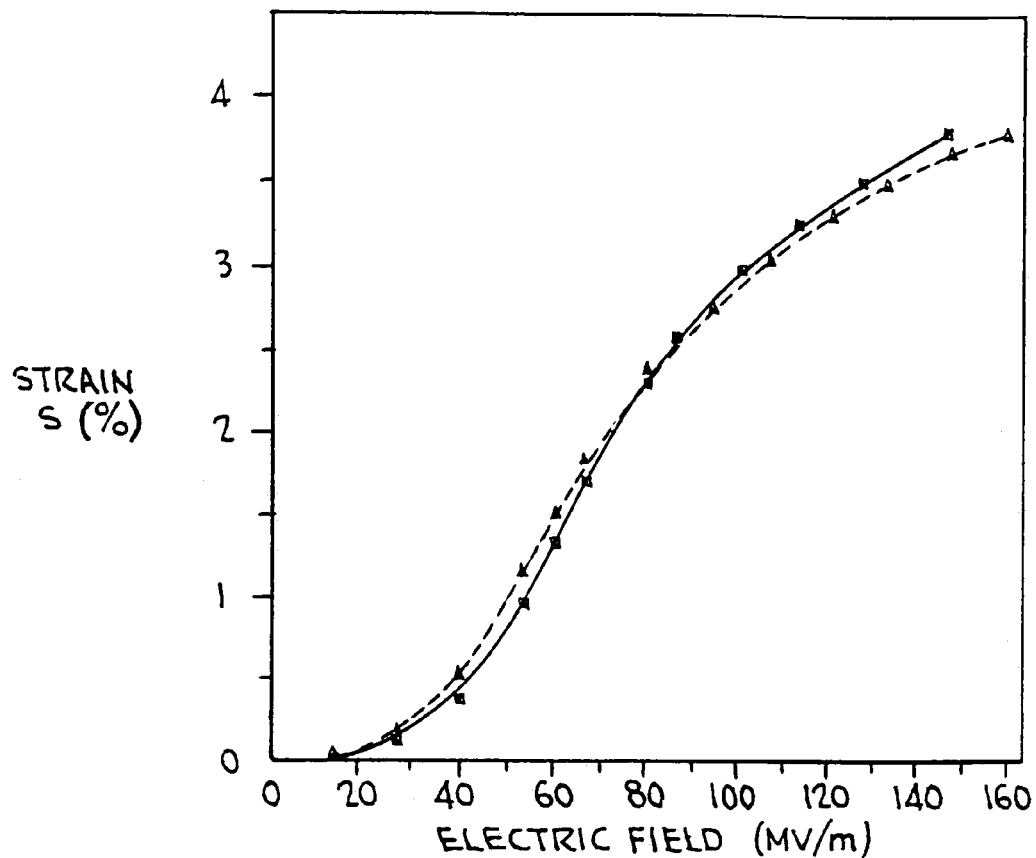
FIG. 5 is a graph illustrating the strain (in %) versus the magnitude of an electric field (in MV/m) of two VDF-TrFE-CFE terpolymers of the present invention.
Figure 6:
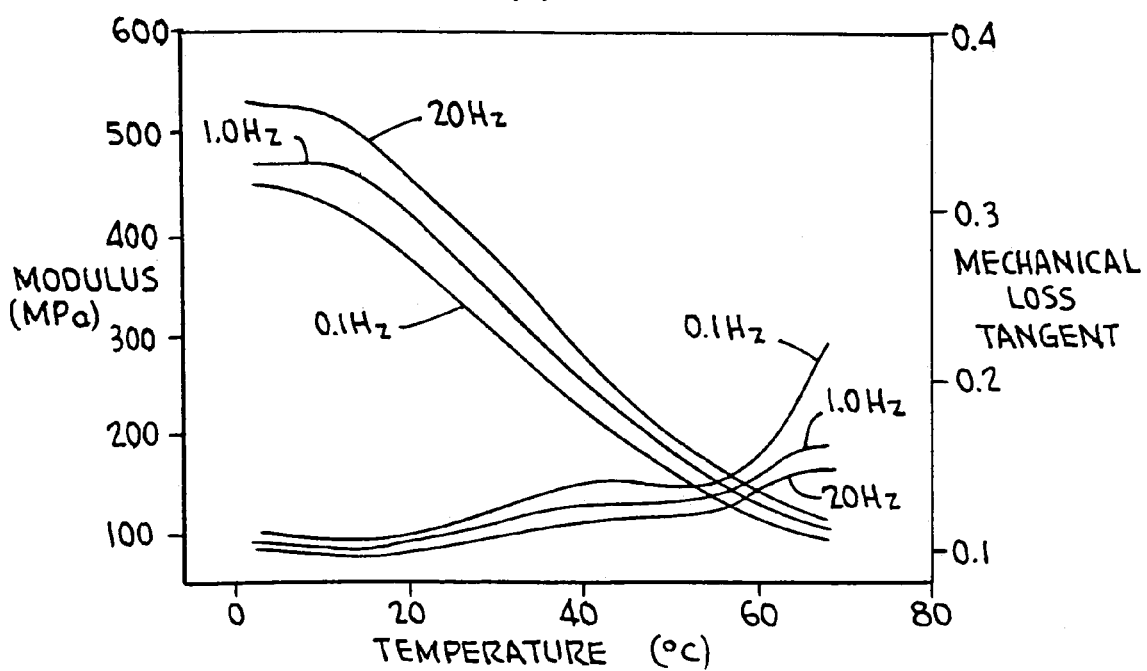
FIG. 6 is a graph illustrating the modulus and mechanical loss tangent versus temperature for various frequencies for VDF-TrFE-CFE terpolymers of the present invention.

The properties of the VDF-TrFE-CFE terpolymers were determined by molecular dynamics simulations and experimentation. The results of these simulations and experimentation are shown in FIGS. 3–6. As such, the terpolymers of the present invention exhibit a high dielectric constant at ambient temperatures as shown in FIG. 3. The terpolymers of the present invention also exhibit large electrical responses in ambient temperatures under electric fields. As such, FIG. 4 illustrates the polarization versus the applied electric field of the VDF-TrFE-CFE terpolymers. FIG. 5 illustrates the strains (in %) versus the electrical field (in MV/m) for two examples of the terpolymers of the present invention, as evidenced during simulations and experimentation. FIG. 6 illustrates the modulus (MPa) and mechanical loss tangent versus temperature for the VDF-TrFE-CFE terpolymers of the present invention.

The terpolymer VDF-TrFE-CFE is preferably synthesized from the polymerization of vinylidene fluoride (VDF), trifluroethylene TrFE) and chlorofluoroethylene (CFE), preferably either 1-chloro-2-fluoroethylene or 1-chloro-1-fluoroethylene. In a preferred embodiment of the terpolymer VDF-TrFE-CFE, the amount of vinylidene fluoride (VDF) used preferably ranges from about 65 mole % to about 71 mole %, more preferably from about 66 mole % to about 70 mole % and most preferably from about 67 mole % to about 69 mole %. The amount of trifluroethylene (TrFE) used preferably ranges from about 26 mole % to about 33 mole %, more preferably from about 27 mole % to about 30 mole %, and most preferably from about 28 mole % to about 29 mole %. The amount of chlorofluoroethylene (CFE) used preferably ranges from about 1 mole % to about 6 mole %, more preferably from about 2 mole % to about 5 mole %, and most preferably from about 3 mole % to about 4 mole %. For example, a VDF-TrFE-CFE terpolymer of the present invention may comprise 68 mole % VDF, 28 mole % TrFE and 4 mole % CFE.

The terpolymer is then subjected to either solvent casting or extrusion and annealed, i.e., heated and then cooled. After either solvent casting or extrusion and annealing, thin films of VDF-TrFE-CFE are electrostrictive, i.e., the films exhibit large mechanical strains when placed in an oscillating electric field.

Since crystallization into large regions is prevented, as described above, the terpolymer VDF-TrFE-CFE anneals as a disordered material with random defect fields underlying its electrostriction. As such, the electrostrictive terpolymer VDF-TrFE-CFE possesses gauche-type conformational defects along the polymer chain that result in a broad distribution of polarizations that favor higher electrostrictive strains than other known electrostrictive polymers.

The electrostrictive terpolymer VDF-TrFE-CFE of the present invention can be used as an electrostrictive material in its annealed state without being subjected to electron irradiation. Since the chloro-monomer added to the P(VDF-TrFE) produces electrostrictive properties, i.e., electrostrictive strains, greater than those strains produced by electron irradiation of P(VDF-TrFE), the VDF-TrFE-CFE terpolymer of the present invention solves the problems associated with processing polymers into electrostrictive materials by electron irradiation.

The electrostrictive terpolymer VDF-TrFE-CFE of the present invention is also conformable, robust, and chemically durable which makes it good for use in hostile environments. The electrostrictive terpolymer VDF-TrFE-CFE may preferably be used as an active material capable of generating sound in acoustic, underwater transducers and mechanical motion in actuator devices. Specifically, the electrostrictive terpolymer VDF-TrFE-CFE is applicable in sensors, sonars in submarines, in actuators and in smart skins of vehicles or materials which are used to sense vibration and control noise, such as in stealth jets and submarines. In these and other applications, the electrostrictive terpolymer provides higher/greater sensitivity, more powerful signals and more efficient energy conversion.

The processing of the electrostrictive terpolymer VDF-TrFE-CFE of the present invention is less expensive and less cumbersome than processing electrostrictive polymers by electron irradiation or other known technologies. In addition, the processing of the electrostrictive polymer VDF-TrFE-CFE of the present invention produces electrostrictive polymers which exhibit larger mechanical strains than other known electrostrictive materials.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

What is claimed is:

1. An electrostrictive terpolymer consisting of:
   vinylidene fluoride in the range of 65 mole % to 71 mole %;
   trifluoroethylene in the range of 26 mole % to 33 mole %; and
   a third monomer, wherein said third monomer is a partially halogenated, ethylene-based monomer containing at least one non-fluorine halogen atom, and selected from the group consisting of 1-chloro-2-fluoroethlylene and 1-chloro-1-fluoroethlylene in the range of 1 mole % to 6 mole % and is a monomer that favors gauche-type conformations along the backbone of the polymer chain of said terpolymer.

2. A method of synthesizing an electrostrictive terpolymer film comprising steps of:
   combining vinylidene fluoride in the range of 65 mole % to 71 mole %, trifluoroethylene in the range of 26 mole % to 33 mole %, and a third monomer, wherein said third monomer is a partially halogenated, ethylene-based monomer containing at least one non-fluorine halogen atom, and is selected from the group consisting of 1-chloro-2-fluoroethlylene and 1-chloro-1-fluoroethlylene in the range of 1 mole % to 6 mole % and is a monomer that favors gauche-type conformations along the backbone of the polymer chains of said terpolymer,
   forming said terpolymer into a thin film by a process selected from the group consisting of solvent casting and extrusion; and
   annealing said terpolymer.

3. The method of synthesizing an electrostrictive terpolymer film according to claim 2 wherein said non-fluorine halogen atom on said third partially halogenated, ethylene-based monomer is of a size sufficient to move said polymer chain away from adjacent polymer chains without inhibiting the formation of polymer crystallites in said terpolymer.

4. An electrostrictive terpolymer consisting of:
   vinylidene fluoride;
   trifluoroethylene; and
   a partially halogenated, ethylene-based third monomer containing at least one non-fluorine halogen atom and wherein said partially halogenated, ethylene-based monomer favors gauche-type conformations along the backbone of the polymer chains of said terpolymer.

5. The electrostrictive terpolymer in accordance with claim 4 wherein said non-fluorine halogen atom side group is of a size sufficient to move said polymer chains away from adjacent polymer chains without inhibiting the formation of polymer crystallites in said terpolymer.

6. The electrostrictive terpolymer according to claim 4 wherein said third, partially halogenated, ethylene-based monomer is selected from the group consisting of 1-chloro-2-fluoroethylene and 1-chloro-1-fluoroethylene.

7. The electrostrictive terpolymer according to claim 6 wherein said terpolymer comprises in the range of 65 mole % to 71 mole % vinylidene fluoride, 26 mole % to 33 mole % trifluoroethylene and 1 mole % to 6 mole % said third partially halogenated, ethylene-based monomer.

8. The electrostrictive terpolymer according to claim 4 wherein said terpolymer comprises in the range of 65 mole % to 71 mole % vinylidene fluoride, 26 mole % to 33 mole % trifluoroethylene and 1 mole % to 6 mole % said third partially third partially halogenated, ethylene-based monomer.

* * * * *